Oct. 22, 1929.  M. C. HORINE  1,732,721
FLEXIBLE EXHAUST PIPE COUPLING
Filed June 20, 1927
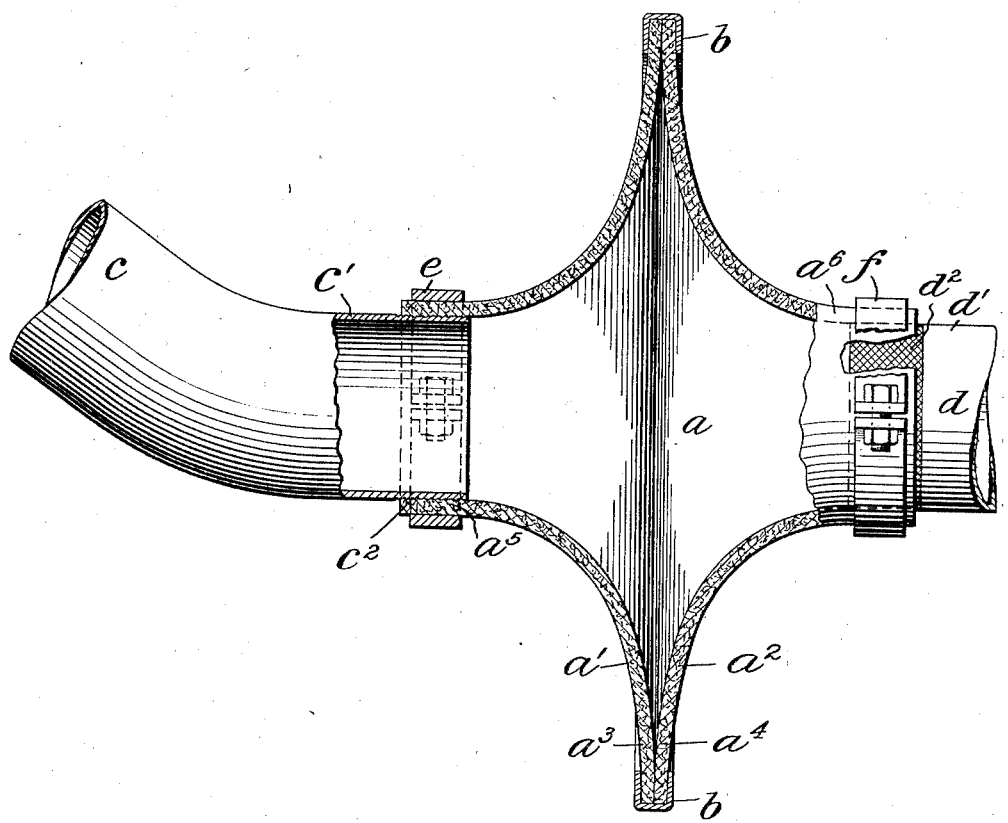
Inventor:
Merrill C. Horine
By his Attorneys.
Redding, Greeley, O'Shea & Campbell Patented Oct. 22, 1929

1,732,721

UNITED STATES PATENT OFFICE

MERRILL C. HORINE, OF GRASMERE, NEW YORK, N. Y., ASSIGNOR TO INTERNATIONAL MOTOR COMPANY, OF NEW YORK, N. Y., A CORPORATION OF DELAWARE

FLEXIBLE EXHAUST-PIPE COUPLING

Application filed June 20, 1927. Serial No. 199,887.

This invention relates generally to flexible couplings for pipes and, more specifically, to flexible couplings which may be particularly suited for use with the exhaust pipes of internal combustion engines as, for instance, in motor vehicles.

In motor vehicles, on account of the weaving of the chassis frame, it is highly desirable to provide means for relative movement between the exhaust manifold, which is rigidly carried with the motor, and the exhaust tail pipe, which is hung from the chassis frame. It is proposed, therefore, to provide such means which, according to the preferred embodiment of this invention illustrated in the accompanying drawing, comprise a coupling formed of two flared elements of wire woven asbestos joined at their flared ends and connected, respectively, to the exhaust manifold and to the exhaust tail pipe. Wire asbestos is used preferably as being the material best suited to withstand the heat and strains to which it must be subjected. In order to insure perfect joints between the coupling and the ends of the manifold and the tail pipe the latter may be knurled or threaded and the coupling clamped thereover by means of metal clamps. The flared ends of the coupling may be conveniently jointed by a metal ring spun over.

In the drawing there has been illustrated in side elevation and partly in section the ends of an exhaust manifold and a tail pipe connected by means of a coupling according to the invention.

The coupling $a$ comprises two elements $a'$, $a^2$ of wire woven asbestos having flared rims $a^3$, $a^4$, respectively. The flared rims $a^3$, $a^4$ are joined by means of the spun over metal ring $b$. The end $c'$ of the exhaust manifold $c$ and the end $d'$ of the exhaust tail pipe $d$ are knurled or threaded as at $c^2$, $d^2$, respectively, to provide a rough surface for connection with the ends $a^5$, $a^6$ of the coupling, the ends of the coupling being secured to the end of the manifold and the end of the tail pipe by means of the metal clamps $e$ and $f$.

The shape which the coupling assumes by being formed of two flared elements joined at their flared ends makes it possible for the coupling to adapt itself to strains impressed upon it due to relative movements between the ends of the two pipes to which it is connected. The material of which the coupling is formed and the manner in which it is connected to the ends of the pipes enhances the ruggedness of the connection as a whole. The material used is flexible and heat resistant and, therefore, renders the coupling peculiarly adaptable to the service in connection with which it has been described.

It will be obvious that the above-described coupling may be used to connect pipes other than an exhaust manifold and tail pipe, no limitation upon the spirit or scope of the invention being intended except as indicated in the following claim.

What I claim is:

The combination with two pipe sections, of means to flexibly couple the ends thereof to permit the passage of hot fluids therethrough, comprising two shape-retaining yet flexible elements of heat resisting material each formed at one end to fit one of the pipe sections and flared out at the other end to form a rim, means to hold the rims in abutment comprising a channel-shaped member overlying the edges of the rims, and means to join the other ends of the two elements to the ends of the pipe sections, comprising knurled ends on the pipe sections and clamps surrounding the ends of the elements.

This specification signed this 17th day of June, A. D. 1927.

MERRILL C. HORINE.